United States Patent
Tuzel et al.

(10) Patent No.: US 9,633,250 B2
(45) Date of Patent: Apr. 25, 2017

(54) METHOD FOR ESTIMATING LOCATIONS OF FACIAL LANDMARKS IN AN IMAGE OF A FACE USING GLOBALLY ALIGNED REGRESSION

(71) Applicant: Mitsubishi Electric Research Laboratories, Inc., Cambridge, MA (US)

(72) Inventors: Oncel Tuzel, Winchester, MA (US); Tim Marks, Newton, MA (US); Salil Tambe, Santa Clara, CA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 30 days.

(21) Appl. No.: 14/859,469

(22) Filed: Sep. 21, 2015

(65) Prior Publication Data

US 2017/0083751 A1    Mar. 23, 2017

(51) Int. Cl.
*G06K 9/62*      (2006.01)
*G06K 9/00*      (2006.01)
(Continued)

(52) U.S. Cl.
CPC ..... *G06K 9/00281* (2013.01); *G06K 9/00302* (2013.01); *G06K 9/4642* (2013.01);
(Continued)

(58) Field of Classification Search
CPC .... G06K 9/00302; G06K 9/4642; G06K 9/52; G06K 9/6218; G06K 9/6256;
(Continued)

(56) References Cited

U.S. PATENT DOCUMENTS 9,317,785 B1*   4/2016   Moon ................. G06K 9/00234
2012/0195495 A1*   8/2012   Shiell ................. G06K 9/00275
                                                                    382/159

(Continued)

OTHER PUBLICATIONS

Xiong et al., Supervised descent method and its applications to face alignment. In Computer Vision and Pattern Recognition (CVPR), 2013 IEEE.

(Continued)

*Primary Examiner* — David F Dunphy
(74) *Attorney, Agent, or Firm* — Gene Vinokur; James McAleenan; Hironori Tsukamoto

(57) ABSTRACT

A method for face alignment operates on a face image and a set of intitial landmark locations by first aligning globally the initial locations to a set of landmark locations of a face with a prototype shape to obtain global alignment parameters, and then warping the initial locations and the image from a coordinate frame of the image to a coordinate frame of the prototype shape according to the global alignment parameters to obtain warped landmark locations and a warped face image. Features are extracted from the warped face image at the warped landmark locations, and a regression function is applied to the features to obtain updated landmark locations in the coordinate frame of the prototype shape. Finally, the updated landmark locations in the coordinate frame of the prototype shape are warped to the coordinate frame of the image, to obtain updated landmark locations.

29 Claims, 7 Drawing Sheets

---

Algorithm 1 Stage $k$ of Globally aligned SDM (GA-SDM)

Inputs:   Prototype shape $\bar{x}$, Regression $\{W_k, b_k\}$,
               Image $I$, Initial landmark estimates $x_k$ 1: Use (8) to find global alignment $A_k$ that warps $x_k$ to $\bar{x}$
2: Warp to prototype coords: $I' = A_k(I)$, $x'_k = A_k(x_k)$
3: Extract features: $\phi'_k = \phi(I', x'_k)$
4: Linear regression: $x'_{k+1} = x'_k + W_k \phi'_k + b_k$
5: Warp back to image coords: $x_{k+1} = A_k^{-1}(x'_{k+1})$

Output: Landmark locations $x_{k+1}$

(51) Int. Cl.
| | |
|---|---|
| *G06T 7/00* | (2017.01) |
| *G06T 3/00* | (2006.01) |
| *G06K 9/52* | (2006.01) |
| *G06T 7/60* | (2017.01) |
| *G06T 3/40* | (2006.01) |
| *H04N 7/15* | (2006.01) |
| *G06K 9/46* | (2006.01) |

(52) U.S. Cl.
CPC ............ *G06K 9/52* (2013.01); *G06K 9/6218* (2013.01); *G06K 9/6256* (2013.01); *G06T 3/0006* (2013.01); *G06T 3/0093* (2013.01); *G06T 3/4053* (2013.01); *G06T 7/0028* (2013.01); *G06T 7/0042* (2013.01); *G06T 7/60* (2013.01); *H04N 7/15* (2013.01); *G06T 2207/30201* (2013.01)

(58) Field of Classification Search
CPC ... G06T 3/0006; G06T 3/0093; G06T 3/4053; G06T 7/0028; G06T 7/0042; G06T 7/60; H04N 7/15
See application file for complete search history.

(56) References Cited

U.S. PATENT DOCUMENTS

| | | | | |
|---|---|---|---|---|
| 2014/0050358 | A1* | 2/2014 | Liu | G06K 9/6209 382/103 |
| 2014/0185924 | A1 | 7/2014 | Cao et al. | |
| 2014/0355821 | A1* | 12/2014 | Solem | G06T 7/0046 382/103 |
| 2015/0169938 | A1* | 6/2015 | Yao | G06K 9/00261 382/103 |
| 2016/0042223 | A1* | 2/2016 | Suh | G06K 9/6296 348/156 |
| 2016/0148425 | A1* | 5/2016 | Hwang | G06K 9/00281 345/419 |
| 2016/0217319 | A1* | 7/2016 | Bhanu | G06K 9/00288 |
| 2016/0275339 | A1* | 9/2016 | De la Torre | G06K 9/00281 |

OTHER PUBLICATIONS

Kazemi et al. "One Millisecond Face Alignment with an Ensamble of Regression Trees," 2014 IEEE Conference on Computer Vision and Pattern Recognition, IEEE, Jun. 23, 2014. pp. 1867-1874.
Cao Xudong et al, "Face Alignment by Explicit Shape Regression," International Journal of Computer Vision, Kluwer Academic Publishers, Norwell US. vol. 107, No. 2, Dec. 13, 2013. pp. 177-190.0.
Xudong Cao et al. "Face Alighment by Explicit Shape Regression," Computer Vision and Pattern Recognition, 2012 IEEE Conference On, IEEE. Jun. 16, 2012. pp. 2887-2894.
Xiong Xuehan et al: "Supervised Descent Method and Its Applications to Face Alignment," IEEE Computer Society Conference on Computer Vision and Pattern Recognition, Proceedings, IEEE Computer Society, US Jun. 23, 2013. pp. 532-539.
Xiong Xuehan et al: "Global Supervised Descent Method," 2015 IEEE Conference on Computer Vision and Pattern Recognition CVPR, IEEE Jun. 7, 2015. pp. 2664-2673.
Tuzel et al. "Robust Face Alignment using a Mixture of Invariant Experts," Sep. 16, 2016, Correct System Design: Lecture Notes in Computer Science. Lecture notes, Springer International Publishing, Cham. pp. 825-841.
Tuzel et al. "Robust Face Alignment using a Mixture of Invariant Experts," ECCV 2016. Nov. 16, 2015. pp. 1-10.
Tuddenham et al. "Generic Face Alignment using Boosted Appearance Model," CVPR 07, IEEE Alignment using Boosted Appearance Model, CVPR 07, IEEE Conference on Computer Vision and Pattern Recognition Jun. 18-23, 2007. Minneapolos, MN USA, IEEE Jun. 1, 2007. pp. 1-8.

* cited by examiner

Algorithm 1 Stage $k$ of Globally aligned SDM (GA-SDM)

Inputs: Prototype shape $\bar{x}$, Regression $\{W_k, b_k\}$.
  Image $I$, Initial landmark estimates $x_k$ 1: Use $\otimes$ to find global alignment $A_k$ that warps $x_k$ to $\bar{x}$
2: Warp to prototype coords: $I' = A_k(I)$, $x'_k = A_k(x_k)$
3: Extract features: $\phi'_k = \phi(I', x'_k)$
4: Linear regression: $x'_{k+1} = x'_k + W_k \phi'_k + b_k$
5: Warp back to image coords: $x_{k+1} = A_k^{-1}(x'_{k+1})$

Output: Landmark locations $x_{k+1}$

*FIG. 2B*

Algorithm 2 Cascade of mixtures of regression experts

Inputs: Image $I$, Initial landmark estimates $x_1$,
Experts $E^l = \{\bar{x}^l, \{W_k^l, b_k^l\}_{k=1,\ldots,K}\}_{l=1,\ldots,L}$ 1: for $k = 1$ to $K$ do
2:     for $l = 1$ to $L$ do
3:         Compute soft assignment $\alpha^l(x_k)$ using (20), (21)
4:         Apply one stage of GA-SDM:
        $x_{k+1}^l = \text{Algorithm 1}(\bar{x}^l, \{W_k^l, b_k^l\}, I, x_k)$
5:     end for
6:     Average over $L$ experts:
    $x_{k+1} = \sum_{l=1}^{L} \alpha^l(x_k) x_{k+1}^l$
7: end for

Output: Final landmark locations $x_{K+1}$

*FIG. 4C*

METHOD FOR ESTIMATING LOCATIONS OF FACIAL LANDMARKS IN AN IMAGE OF A FACE USING GLOBALLY ALIGNED REGRESSION

FIELD OF THE INVENTION

This invention relates generally to computer vision and its applications, and more particularly to aligning faces in images.

BACKGROUND OF THE INVENTION

As well known in the art, face alignment refers to locating pixels in an image corresponding to a set of predefined facial landmarks. Each landmark is associated with a specific facial feature, such as the tip of the nose, corners of the eyes, arch of the eyebrows and curvature of the lips.

Face alignment is important for many computer vision applications, such as face recognition, face tracking, face pose estimation, facial expression analysis, and face modeling, as well as human-computer interfaces (HCI) in general. In addition, face alignment is useful in vehicle-related applications such as driver monitoring and advanced driver assistance systems (ADAS). Face alignment is a difficult problem due to large variations in factors such as pose, facial expression, illumination, and occlusion.

Previous approaches to face alignment have used various methods such as Active Shape Models (ASMs), Active Appearance Models (AAMs), or Constrained Local Models (CLMs). CLMs have explicit joint constraints on the locations of the landmarks, e.g., a subspace shape model, that constrain the locations of the landmarks with respect to each other. Building on CLMs, a Gauss-Newton Deformable Part Model (GN-DPM) jointly fits an appearance model and a global shape model using Gauss-Newton optimization.

Recently, the focus in face alignment has shifted toward discriminative methods. The distinguishing feature of those methods is that an explicit regression function is learned. The regression function updates estimates of the landmark locations, based on features extracted at previously estimated facial landmark locations.

Tree-based regression methods can estimate the landmark locations quickly. In one tree-based method, a set of local binary features can be learned using random forest regression to jointly learn a linear regression function for the final estimate of the landmark locations. Random forest regression constructs a multitude of decision trees at training time. Another method uses a gradient boosting tree algorithm to learn an ensemble of regression trees.

In a Supervised Descent Method (SDM), a cascade of regression functions operate on features extracted with a Scale Invariant Feature Transform (SIFT) to iteratively update estimated landmark locations. In the SDM, no explicit face shape constraints exist on the locations of the landmarks. This is not ideal, because the locations of adjacent facial landmarks may drift apart during the regression.

Furthermore, in the SDM, the same linear regression function must work across all possible variations in facial expressions and pose, including both in-plane and out-of-plane head rotations. This requires a large and varied training dataset, and also forces the learned regression functions to be generic, thereby limiting accuracy.

SUMMARY OF THE INVENTION

The embodiments of the invention provide a method for face alignment, i.e., estimating locations of facial landmarks in images, using globally aligned regression. The method is called Globally Aligned Supervised Descent Method (GA-SDM). GA-SDM operates as a cascade of K stages, also known as iterations, wherein each stage includes a global alignment step and a regression function.

The method acquires an image of a face, e.g., using a camera or obtaining a previously captured image. The input to the method includes an intial estimate of a set of locations of the landmarks, refered to as initial landmark locations. The set of initial landmark locations is globally aligned to a set of landmark locations of a face with a prototype shape to obtain global alignment parameters. The set of initial landmark locations and the image are warped from a coordinate frame of the image to a coordinate frame of the prototype shape according to the global alignment parameters, to obtain warped landmark locations and a warped face image.

Features are extracted from the warped face image at the warped landmark locations. A regression function is applied to the features to obtain updated landmark locations in the coordinate frame of the prototype shape. Then, the updated landmark locations in the coordinate frame of the prototype shape are warped to the original coordinate frame of the image to obtain updated landmark locations in the acquired image.

To improve alignment accuracy, preferred embodiments repeat the steps for K iterations, while using a different regression function at each iteration.

The landmark locations can be used in a number of applications including: human-machine interaction, video conferencing, gaming, animation, gaze tracking, emotion analysis, and health monitoring; automobile-related applications such as driver monitoring and advanced driver assistance systems (ADAS); and numerous computer vision tasks including face recognition, facial expression recognition and synthesis, and super-resolution imaging. Face alignment is particularly challenging when there are large variations in facial expression and large variations in pose, e.g., rotations within the image plane, known as in-plane rotations, and rotations out of the image plane, known as out-of-plane rotations.

To address this issue, some embodiments of the invention provide a mixture of L GA-SDM regression experts, hereinafter referred to simply as "experts." Each expert $E^l$, where $l \in \{1, \ldots, L\}$, includes a different regression function $\{W, b\}$ for each of K stages of the cascade, where W and b represent coefficients and bias of the regression function, respectively.

Each expert has its own prototype shape for globally aligning the landmark locations, e.g., nose tip and eye corners. This enables each expert to specialize in a different part of a joint space of pose and expressions. In some embodiments, a separate regression model is learned for each expert at each stage of the cascade. Some embodiments also provide deformation constraints within a discriminative alignment framework to increase accuracy.

Features used by the method can include:
 (1) A global alignment step, before each iteration of regression, which makes the method invariant to a specified class of defined global transformations;
 (2) An extension to the feature vectors that enables the regressions to penalize deviations of feature locations from a prototype face shape;
 (3) A mixture-of-experts regression at each stage of the cascade, in which each expert has its own regression function that is specialized to align a different subset of input data, e.g., a particular range of poses and expressions; and (4) An affine-invariant clustering procedure to learn the prototype face shapes used by the experts.

BRIEF DESCRIPTION OF THE DRAWINGS

FIG. 2B is a block diagram of pseudocode corresponding to the method shown in FIG. 2A;

FIG. 4C is a block diagram of pseudocode of K iterations of the method of FIG. 4A.

DETAILED DESCRIPTION OF THE PREFERRED EMBODIMENTS

Figure 1:
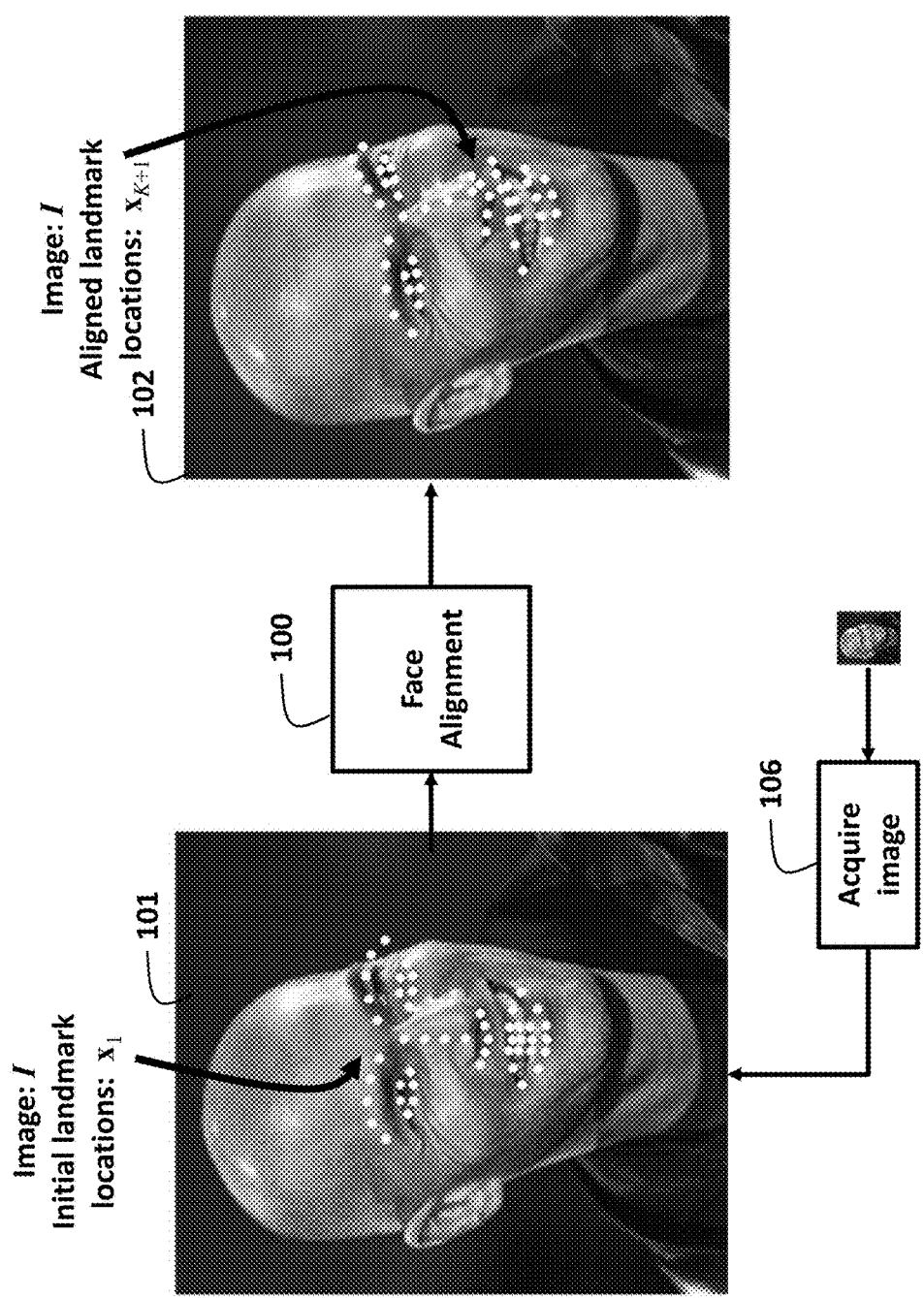
FIG. 1 is a schematic of face alignment for images according to embodiments of the invention.

As shown in FIG. 1, the embodiments of our invention provide a method for face alignment 100 using globally aligned regression. In the art, face alignment refers to the process of locating pixels in an image corresponding to a set of facial landmarks. Each landmark is associated with a specific location on the face, such as the tip of the nose, the corners of the eyes, and corners of the eyebrows and lips. If the landmark locations are not correct, then the face alignment essentially updates the landmark locations to their correct locations in the image.

Input 101 to the method is an image I and a set of initial landmark locations $x_1$ associated with the image. The image may be acquired 106 by a camera, or be obtained by other means or from other sources, e.g., a memory transfer, or wireless or wireless communication. The methods and processes described herein essentially operate on the image and the set of initial landmark locations.

The initial landmark locations can be marked manually or automatically, e.g., using a facial part detection algorithm or a face detection algorithm. In the latter case, the initial landmark locations are a mean location of each landmark from a set of training face images, which are translated and scaled to fit a bounding box. Note that initial locations of the landmarks do not need to be marked accurately.

The initial landmark locations $x_1$ 101 represent an initial estimate of the location of every facial landmark in the image I. After the alignment, the aligned landmark locations $x_{K+1}$ 102 are shown superimposed on the image I of the face.

Figure 2A:
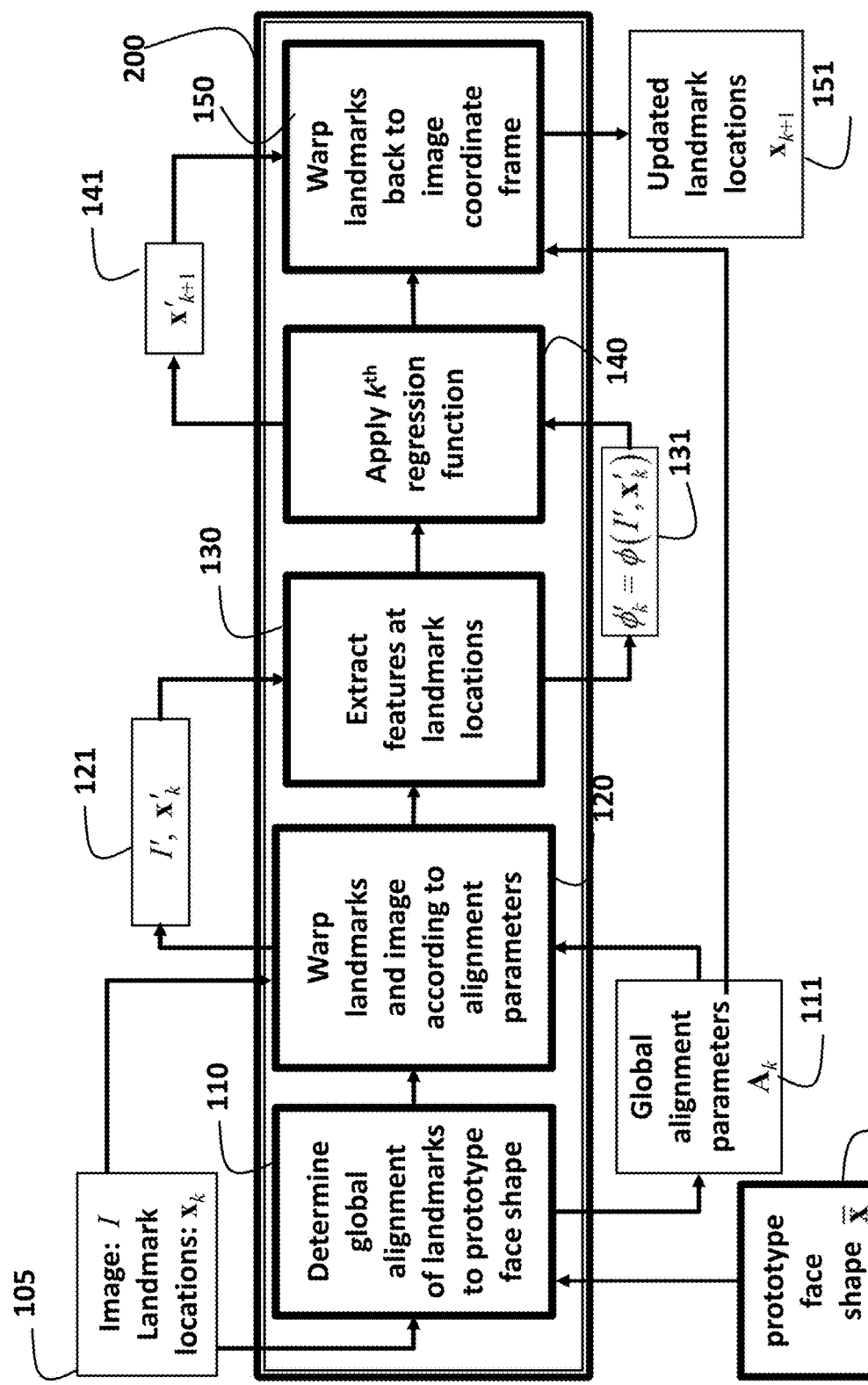
FIG. 2A is a flow diagram of a method for face alignment using the kth iteration of our GA-SDM method, according to embodiments of the invention.

FIG. 2A shows a flow diagram of one iteration, which we call stage k, of GA-SDM 200, using global alignment and regression, according to embodiments of the invention. The intial landmark locations $x_k$ 101 in the image I are globally aligned 110 to landmark locations of a prototype face shape $\bar{x}$ 103 to produce alignment parameters $A_k$ 111. In preferred embodiments, the prototype face shape is learned from training images, as described below. In other embodiments, the prototype face shape could, for example, be obtained or adapted from an existing 2D or 3D face model.

The image I and landmark locations $x_k$ are warped 120 according to the alignment parameters $A_k$ 111 to produce image I' and landmark locations $x'_k$ 121 expressed in a coordinate frame of the prototype face shape. These locations are used to extract 130 features $\phi'_k = \phi(I', x'_k)$ 131 from the warped image I' expressed in the coordinate frame of the prototype face shape.

A $k^{th}$ regression function is applied 140 to produce updated landmark locations $x'_{k+1}$ 141 in the coordinate frame of the prototype face shape. The updated landmark locations are then warped back to coordinate frame of the image using $A_k^{-1}$, which denotes the inverse of the alignment transformation with parameters $A_k$. This yields the updated landmark locations $x_{k+1}$ 151 in the coordinate frame of the original image I. The steps shown in FIG. 2A and other figures can be performed in a processor connected to memory and input/output interfaces, as known in the art.

FIG. 2B shows pseudocode for one iteration (stage k) of GA-SDM, corresponding to the flow diagram in FIG. 2A. The steps and variables used in the pseudocode are described herein and in the figures.

Figure 3:
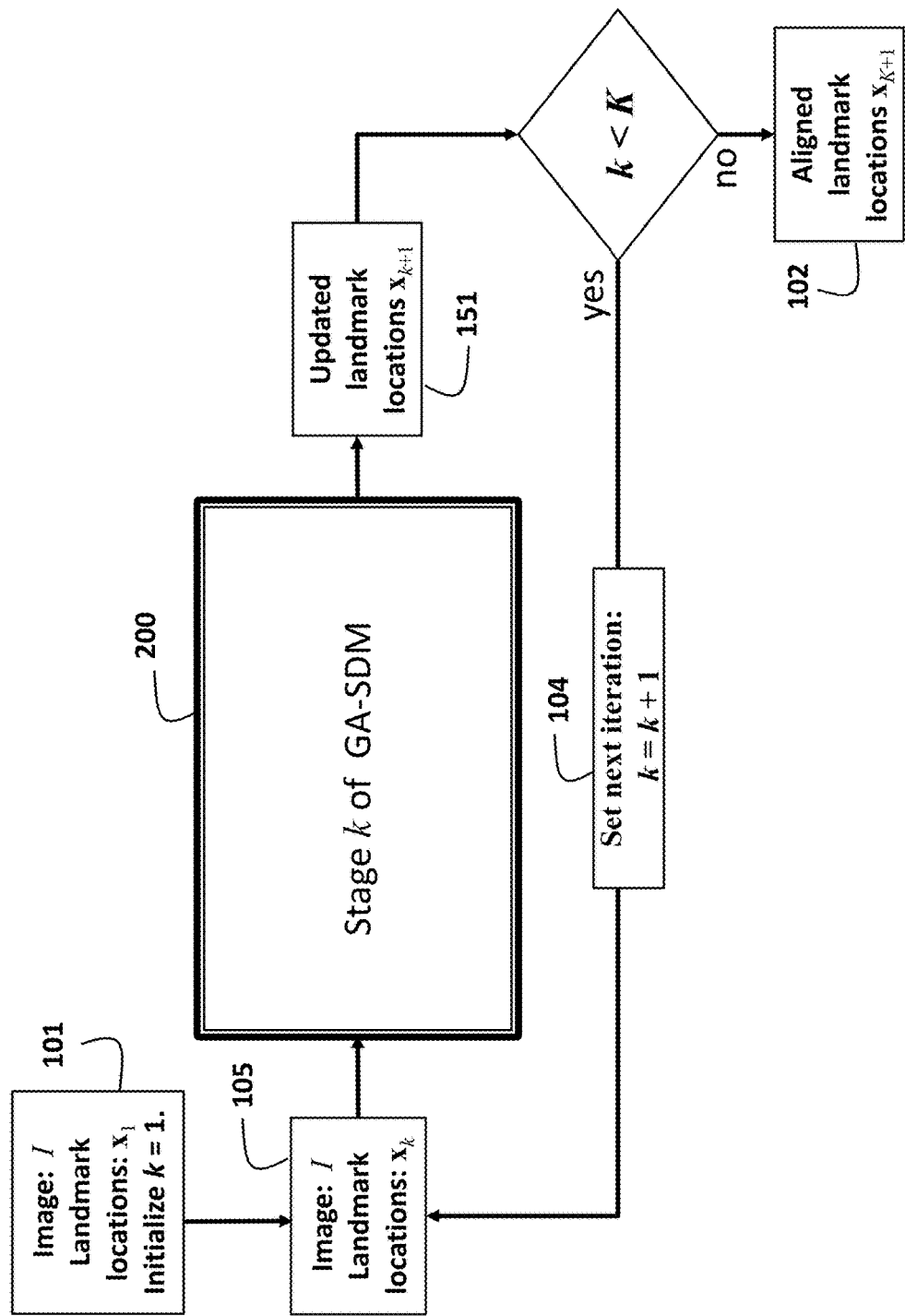
FIG. 3 is a flow diagram of face alignment using K iterations of GA-SDM according to embodiments of the invention.

As shown in FIG. 3, the GA-SDM procedure is iterated 104 for K times, using a different regression function at each stage for better alignment. The method begins at stage k=1, with an input image I and an initial estimate $x_1$ 101 of the landmark locations in the image. These are used as input 105 to the first stage of GA-SDM, i.e., stage k of GA-SDM 200 where k=1. GA-SDM is iterated for K stages (K≥1). The output of stage k is the updated estimate of the landmark locations $x_{k+1}$ 151. When k<K, the stage number, k, is incremented by 1, and the previous stage's output $x_{k+1}$ 151 becomes the current stage's input $x_k$ 105. At the end of stage K of GA-SDM (when k=K), the updated landmark locations $x_{k+1}$ 151 are used as the final output of GA-SDM, the aligned landmark locations $x_{K+1}$ 102.

Figure 4A:
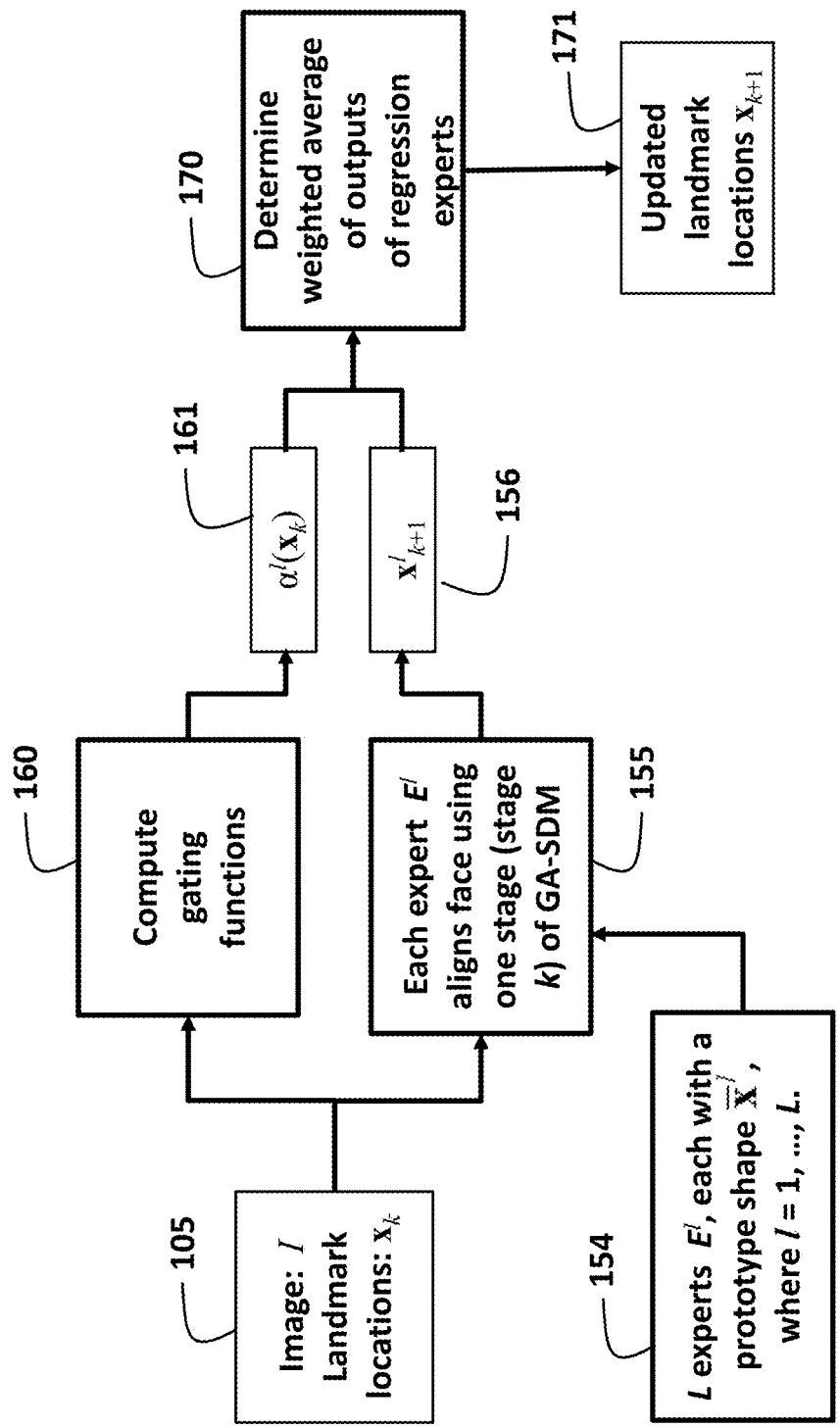
FIG. 4A is a flow diagram of one iteration of applying a mixture of GA-SDM regression experts (hereinafter "experts") according to embodiments of the invention.

FIG. 4A shows one iteration (stage k) of applying a mixture of GA-SDM regression experts (hereinafter "experts"), according to preferred embodiments of the invention. There are L experts $E^l$, each with its own prototype shape $\bar{x}^l$ 154, where $l \in \{1, \ldots, L\}$. For the image I and landmark locations $x_k$ 105, gating functions $\alpha^l(x_k)$ 161 are computed 160. The landmark locations $x_k$ are aligned 155 by each expert $E^l$ using one stage (stage k) of GA-SDM 200, to obtain updated landmark locations $x_{k+1}^l$ 156 expressed in the coordinate frame of the original image I. Then, a weighted average of the outputs of the experts is determined 170 to produce the updated landmark locations $x_{k+1}$ 171.

Figure 4B:
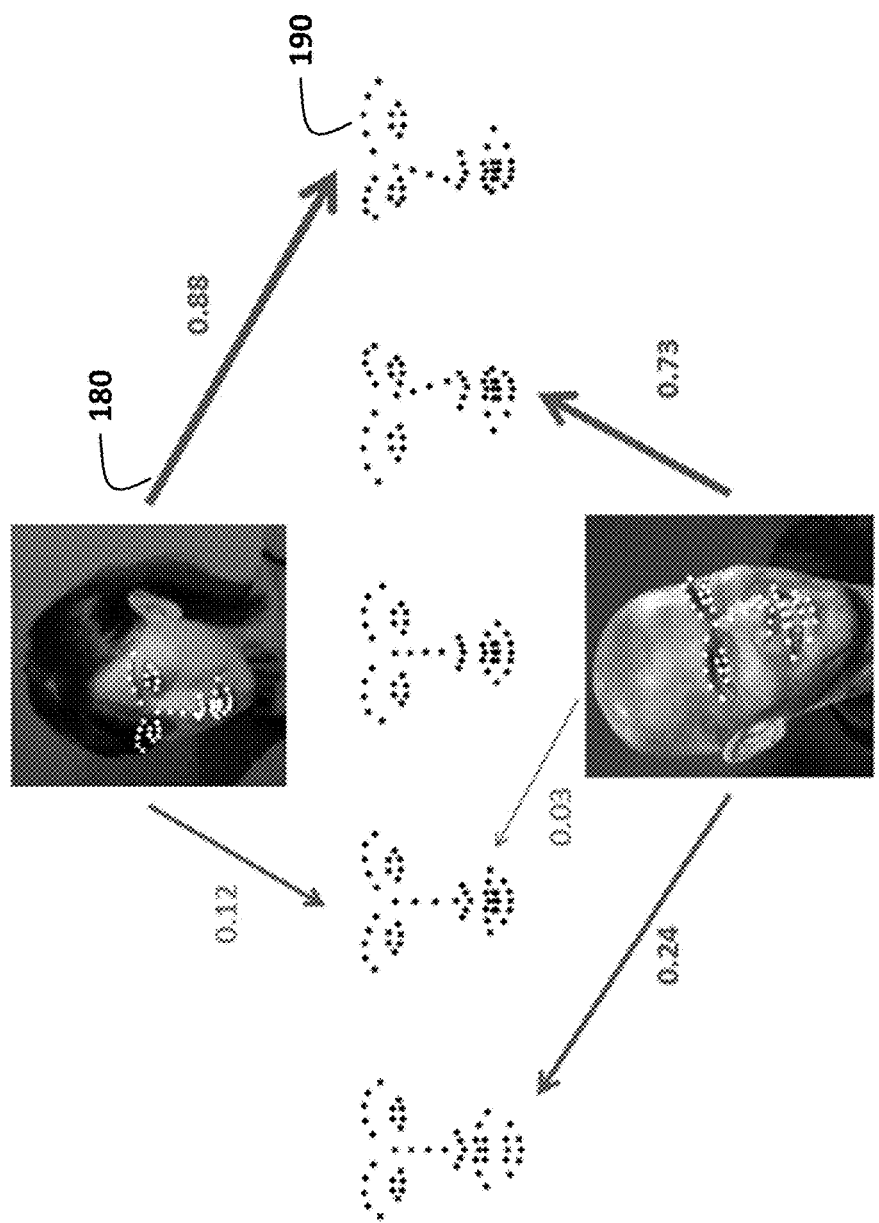
FIG. 4B is a schematic of mixture of experts, each specialized for a particular pose or facial expression.

FIG. 4B schematically shows 5 prototype face shapes $\bar{x}^l$ 190, corresponding respectively to L=5 experts, each specialized for a particular range of poses or facial expressions. The arrows 180 show the assignment weights of each image's landmark locations to the five experts.

Our method is related to the prior art Supervised Descent Method (SDM) in that preferred embodiments perform a cascade of regressions on Scale Invariant Feature Transform (SIFT) features that are computed at a set of currently estimated feature locations.

Our method improves upon the prior art SDM in a number of ways. In the conventional SDM, the linear regression functions learned must be able to handle faces in a wide range of input poses.

Instead, we use a global alignment step at each stage of the cascade, prior to the regression step, which makes our method invariant to an entire class of global transformations. In some embodiments, we use a class of all possible 2D affine transformations. As a result, our regression functions do not need to correct for many global variations in pose, so that the regression functions can be fine tuned to handle smaller variations in landmark locations.

The conventional SDM has no explicit global constraints to jointly limit the locations of multiple landmarks. Our method addresses this issue by penalizing deviations of landmark locations from a prototype face shape. We accomplish this in the regression framework by extending the feature vector to include the difference between the prototype landmark locations and the currently estimated landmark locations, weighted by a scalar that determines a rigidity of the model. This global regularization of the face shape (i.e., of the landmark locations) prevents features from drifting apart.

To further improve the flexibility of our model to handle variations in pose and expression, we replace the simple linear regression function at each stage of the cascade by a mixture of expert linear regression functions. Each expert in the mixture corresponds to a different prototype face shape, e.g., each expert function can handle a different range of out-of-plane head rotations and facial expressions.

We now describe the conventional Supervised Descent Method (SDM), which is related to our method, and notation used herein.

Let I be an image of a face, and let x be a 2p×1 vector of locations of p facial landmarks in image coordinates. At each of the p landmark locations in x, a d-dimensional feature vector, e.g., d=128, is extracted. Let $\phi(I, x)$ be the pd×1 consolidated feature vector, which is a concatenation of the p feature descriptors extracted from the image I at the landmark locations x. In some embodiments, the features are Scale Invariant Feature Transform (SIFT) features. In other embodiments, the features are Histogram of Oriented Gradients (HOG) features.

Given a current estimate of the landmark locations $x_k$ in image I, the SDM formulates the alignment problem as determining an update vector $\Delta x$, such that the features determined at an updated set of landmark locations $x_k + \Delta x$ better match the features determined at a set of ground truth landmark locations $\hat{x}$ in the image.

The corresponding error can be expressed as a function of the update vector $\Delta x$:

$$f(x_k + \Delta x) = \|\phi(I, x_k + \Delta x) - \hat{\phi}\|^2, \quad (1)$$

where $\hat{\phi} = \phi(I, \hat{x})$. The function $f$ can be minimized by Newton's method. That requires the computation of Hessian and Jacobian functions, for which $f$ must be twice differentiable. However, this differentiability condition may not always hold, and it definitely does not hold when $\phi$ is the SIFT operator. Therefore, that method requires computationally complex numerical computations of the Jacobian and Hessian matrices, and convergence of the resulting minimization procedure is slow.

This is addressed in the SDM by successively updating $x_k$ using learned descent directions instead of explicit Hessian and Jacobian computations. The motivation for the form of the linear function and feature vectors used to compute the learned descent directions follows from Newton's method.

The second-order Taylor approximation to (1) is $$f(x_k + \Delta x) \approx f(x_k) + [J_f(x_k)]^T \Delta x + \frac{1}{2} \Delta x^T H(x_k) \Delta x, \quad (2)$$

where $J_f$ is the Jacobian matrix of $f$ with respect to x, and H is the Hessian matrix of $f$. By the chain rule, $$J_f(x_k) = \frac{\partial \phi}{\partial x} \frac{\partial f}{\partial \phi} = 2J_\phi(x_k)[\phi_k - \hat{\phi}], \quad (3)$$

where $J_\phi$ is the Jacobian of $\phi$ with respect to x, and we define $\phi_k = \phi(I, x_k)$.

The Newton step is $$\Delta x = -H^{-1} J_f = -2H^{-1} J_\phi[\phi_k - \hat{\phi}], \quad (4)$$

where we omit the argument $x_k$ from the Hessian and Jacobian to emphasize the dependence on $\phi_k$.

Equation (4) is approximated by a multivariate linear regression $$\Delta x = W_k \phi_k + b_k, \quad (5)$$

in which the coefficients $W_k$ and bias $b_k$ do not depend on the value of $x_k$.

The SDM uses training data to learn a cascade of K linear regressions $\{W_k, b_k\}$, where k=1, . . . , K. Then, the alignment is achieved by sequentially applying the learned regressions to features computed at the landmark locations output by a previous stage of the cascade:

$$x_{k+1} = x_k + W_k \phi_k + b_k. \quad (6)$$

To learn the regressions $\{W_k, b_k\}$, the N face images in the training data are augmented by repeating every training image M times, each time perturbing the ground truth landmark locations by a different random displacement. For each image $I_i$ in this augmented training set (i=1, . . . , MN), with ground truth landmark locations $\hat{x}_i$, the landmarks are perturbed by a random displacement $\Delta \hat{x}_i$. The first regression function (k=1) is then learned by minimizing an $L_2$-loss function $$\{W_k, b_k\} = \underset{W,b}{\operatorname{argmin}} \sum_{i=1}^{MN} \|\Delta \hat{x}_i - W\phi(I_i, \hat{x}_i - \Delta \hat{x}_i) - b\|^2. \quad (7)$$

For training the later regressions $\{W_k, b_k\}_{k=2, \ldots, K}$, rather than using a random perturbation, the update vector $\Delta \hat{x}_i$ is the residual after the previous stages of the regression cascade.

We now describe our model. Our model significantly improves upon the alignment accuracy and robustness of the prior art. Preferred embodiments use: a global alignment step before each stage of regression;
learned deformation constraints on the regressions; and
a mixture of expert regressions, rather than a single linear regression, at each stage of the cascade.

Global Alignment

In order for the regression functions in conventional SDM to learn to align facial landmarks for a variety of face poses and expressions, the training data must contain sufficient examples of faces covering the space of possible variations. Although being able to align faces at any pose is a desired property, learning such a function requires collecting (or synthesizing) training data containing all possible face poses. In addition, the learning is a more difficult task when there are large variations in the training set, and hence either a sufficiently complex regression model (functional form and number of features) is required, or the alignment method compromises accuracy in order to align all these poses.

As a general rule, increasing the complexity of the model leads to a poorer generalization performance. This suggests that a simpler or more regularized model, which learns to align faces for a limited range of poses, can perform better for those poses than a general alignment model that has been trained on all poses.

As a simple example, consider a regression function that is trained using a single upright image of a face, rather than a regression function trained using multiple in-plane rotations of the face image. In the former case, the regression function must have a root for the upright pose, whereas in the latter case, the regression function must have a root for every in-plane rotation.

Our goal with global alignment is to train each regression on a smaller set of poses, while still being able to align faces in an arbitrary pose. To do so, we apply a global alignment step prior to each stage's regression function.

Globally Aligned Supervised Descent Method (GA-SDM)

FIGS. 2A, 2B, and 3 show our method for aligning faces using global alignment and regression, which we call Globally Aligned Supervised Descent Method (GA-SDM). FIG. 2A shows a flow diagram of the steps of one iteration (stage k) of the method, and FIG. 2B shows the corresponding pseudo code.

FIG. 3 shows a flow diagram for the entire GA-SDM method (with K stages). The steps in the method can be performed in a processor connected to memory and input/output interfaces as known in the art. All variables used in the pseudocode are described herein.

We refer to the method described in FIGS. 2A and 2B as one stage, stage k, of GA-SDM. This is because in the preferred embodiments, the method is iterated K times (where K≥1), and each iteration k is called stage k of GA-SDM. FIG. 3 shows the entire GA-SDM method that includes K stages. However, the method described in FIGS. 2A and 2B may be performed just once as a stand-alone method, which is a special case of GA-SDM in which K=1.

Input to the stage k of GA-SDM is a vector of landmark locations of a prototype face shape $\bar{x}$ 103, a linear regression function defined by $\{W_k, b_k\}$, wherein $W_k$ and $b_k$ respectively represent coefficients and a bias of the regression function, as further described below, an image I of a face, and initial locations $x_k$ of identified facial landmarks in the image.

The prototype face shape $\bar{x}$ 103 is a 2p×1 vector containing locations of p facial landmarks. In some embodiments, the prototype shape $\bar{x}$ comprises a mean location of each landmark over a set of training data, after uniform scaling and translation transformations have been applied to each training image to make all images share a canonical location and scale.

The preferred embodiments use affine transformations as the class of functions for the global alignment, as described below, although other embodiments may use other classes of global transformations. At each stage k of regression, we determine 110 an affine transformation $A_k$ 111 that transforms the landmark locations $x_k$ that were estimated by the previous stage of regression so as to minimize a sum of squared distances to the prototype landmark locations $\bar{x}$:

$$A_k = \arg\min_{A \in \mathcal{A}} \|A(x_k) - \bar{x}\|^2, \quad (8)$$

where $\mathcal{A}$ denotes the set of all affine transformations.

We use the transformation $A_k$ to warp 120 the image I and the landmark locations $x_k$ 101 into the prototype shape coordinate frame: $I' = A_k(I)$, and $x'_k = A_k(x_k)$. Note that we slightly abuse notation here by using the same affine transformation operator $A_k$ to both transform a vector of landmark locations, $A_k(x_k)$, and warp an image, $A_k(I)$.

Next, we extract 130 features, e.g., SIFT features, from the warped image I' at the estimated landmark locations $x'_k$ in the prototype coordinate frame, and apply 140 the linear regression $$x'_{k+1} = x'_k + W_k \phi(I', x'_k) + b_k. \quad (9)$$

Then, we warp 150 back to image coordinates using $A_k^{-1}$, the inverse of transformation $A_k$. We output the updated landmark locations 151 in the image coordinate frame, which are given by $x_{k+1} = A_k^{-1}(x'_{k+1})$.

In some embodiments, the linear regression 140 can be replaced by another type of regression function, such as a kernel regression, a tree regression, a regression forest, or a neural network regression.

Learning Deformation Constraints

The conventional SDM for tracking landmark locations has no explicit constraint on the regression behavior of neighboring landmarks, which introduces the possibility that the landmarks can drift apart. In general, this would be a straightforward problem to deal with in an optimization setting by introducing explicit constraints or penalties on the free-form deformation of the landmark.

Rather than utilizing an optimization procedure, which can be slow, we want to maintain the speed advantages of forward prediction using a regression function. To achieve the effect of constraints within a regression framework, we use additional features that allow the regression model to learn to constrain landmark locations.

We use a soft constraint in the form of a cost term $\|x-\bar{x}\|^2$ in equation (1):

$$f_c(x_k + \Delta x) = \|\phi(I, x_k + \Delta x) - \hat{\phi}\|^2 \lambda \|x_k + \Delta x - \bar{x}\|^2 \quad (10)$$

This enforces a quadratic penalty when the landmark locations drift away from the prototype shape $\bar{x}$. A weight $\lambda$ controls the strictness of the constraint on the deviations of the locations from the prototype shape. In constrained optimization, a "soft" constraint is a term that penalizes the amount by which a constraint is not satisfied.

The Newton step for this constrained $f$ is $$\Delta x = -2H^{-1}(J_\phi \ I)\begin{pmatrix} \phi_k - \hat{\phi} \\ \lambda(x_k - \bar{x}) \end{pmatrix}, \quad (11)$$

where H the Hessian matrix of $f_c$ with respect to x, and $J_\phi$ is the Jacobian of $\phi$ with respect to x. Just as we approximated (4) by (5), we can approximate this constrained Newton step (11) by a linear regression function:

$$\Delta x = W_k \phi^*_k + b_k, \quad (12)$$

where the constrained feature vector, $\phi^*_k$, is $$\phi^*_k = \begin{pmatrix} \phi_k \\ \lambda(x_k - \bar{x}) \end{pmatrix}. \quad (13)$$

As in the unconstrained SDM, we can learn the regression coefficients $W_k$ and the bias $b_k$ using training data. The only difference between the constrained equation (12) and the unconstrained regression model in equation (5) is that in the constrained version, we extend the feature vector to include additional features, $\lambda(x_k - \bar{x})$, encoding deviations of the landmark locations from the prototype shape landmark locations.

The constrained regression learns to move landmark locations towards the prototype shape by learning negative values for the associated regression coefficients. The norms of the learned coefficients are larger for the initial regression stage of the cascade, but smaller in the later stages, which enforces weaker constraints on deformation as the landmark locations converge to their final values.

Note that it is possible to incorporate the weight $\lambda$ into $W_k$ and $\bar{x}$ into $b_k$, and just expand the feature vector $\phi^*$ with $x_k$ rather than $\lambda(x_k-\bar{x})$. However, we keep the difference vector form as in equation (13), which becomes important for the regularized training described below.

To unify notation, refer to the expanded feature vector $\phi^*$ simply as $\phi$. That way, equations (5-9), FIG. 2A, and Algorithm 1 of FIG. 2B apply to the constrained model without modification. The equations below that use $\phi$ may similarly be considered to apply to the constrained model.

Note that the preferred embodiments use the expanded feature vector as part of our GA-SDM rather than as a simple extension of SDM. Thus in the preferred embodiments, the features $\phi(I', x'_k)$ are extracted from the warped image $I'$ at the landmark locations $x'_k$ in the prototype coordinate frame (i.e., the warped landmark locations), as in equation (9). Thus in the preferred embodiments, the additional features in the expanded feature vector actually have the form $\lambda(x'_k-\bar{x})$, encoding deviations of the warped landmark locations $x'_k$ from the prototype shape landmark locations.

Mixture of GA-SDM Regression Experts

The global alignment described above allows our model to learn regression functions that are invariant to affine transformations of faces. Still, the remaining variations in face image data, e.g., due to out-of-plane rotations and facial expressions, are large enough that it is challenging for a single regression function to accurately align all faces.

In particular, typical training sets of images include many more frontal faces with neutral facial expressions than faces with large out-of-plane rotations or extreme expressions. Therefore, a prototype face derived from those training data (e.g., a mean face) is very close to a frontal face with neutral expression, and the regression function tends to work less well for more extreme poses and expressions.

Preferred embodiments use a mixture-of-experts regression model, in which each expert has a regression function that is specialized for a different subset of the possible poses and expressions. Each expert's subset is determined by a prototype shape for the expert. We construct L prototype shapes, $\{\bar{x}^l\}l=1, \ldots L$, such that the ground truth landmark locations $\hat{x}_n$ of each of the N faces in the dataset are well aligned with one of prototype shape landmarks. The determination of the prototype shapes can be expressed as an optimization problem $$\{\bar{x}^l\}_{l=1,\ldots,L} = \arg\min_{\{\bar{x}^l\}_{l=1,\ldots,L}} \sum_{n=1}^{N} \min_{\substack{A \in \mathcal{A}, \\ l \in \{1,\ldots,L\}}} \|A(\hat{x}_n) - \bar{x}^l\|^2, \quad (14)$$

where each $\bar{x}^l$ is a 2p×1 vector representing a possible prototype shape, i.e., the locations of p facial landmarks.

$\mathcal{A}$ represents the entire class of transformations e.g., the set of all possible affine transformations, whereas A represents one particular transformation that is a member of that set.

If the class of transformations $\mathcal{A}$ only contains the identity transformation, then this problem reduces to Euclidean clustering of training samples based on landmark locations.

When $\mathcal{A}$ is the class of affine transformations, we call this affine-invariant clustering. In this case, equation (14) is a homogenous optimization problem in which additional constraints on the prototype shapes or the transformations are necessary to avoid the zero solution, which assigns zero to all of the transformations and prototype shapes. Moreover, the objective function is non-convex due to the joint optimization of the shapes and the assignment of training samples to shapes. We decouple this problem into two convex sub-problems, which we solve iteratively.

The first sub-problem assigns every training face image n to one of the prototype shapes via $$l_n = \underset{l}{\arg\min} \left[ \min_{A \in \mathcal{A}} \|A(\hat{x}_n) - \bar{x}^l\|^2 \right], \quad (15)$$

assuming that the prototype shapes $\bar{x}^l$ are fixed. This problem can be solved independently for each training face. The optimal assignment is the prototype shape to which the face's ground truth landmark locations can be affine-aligned with minimum alignment error.

The second sub-problem solves for the prototype shapes. Each prototype shape includes the landmark locations that minimize the sum of the squared affine alignment errors over the ground truth locations $\hat{x}_n$ of all of the training faces that were assigned to that prototype shape:

$$\bar{x}^l = \underset{\bar{x}^l}{\arg\min} \sum_{n \text{ s.t. } l_n=l} \min_{A \in \mathcal{A}} \|A(\hat{x}_n) - \bar{x}^l\|^2 \quad (16)$$

$$\text{s.t. } C\bar{x}^l = m. \quad (17)$$

To avoid degeneracy, we use linear constraints on the prototype shape. In some embodiments, these constraints enforce, e.g., that the mean location of the landmarks of the left eyebrow is fixed, as are the mean location of the landmarks of the right eyebrow, and the mean vertical location of the lip landmarks. These constraints can be expressed using equation (17) by selecting a matrix C and a vector m such that the rows of the matrix C select the coordinates of the eyebrow and lip landmarks from the vector i of landmark locations, and the rows of the vector m, which correspond to the rows of the matrix C, encode the fixed mean locations. This optimization is a quadratic problem with linear constraints, in which the optimal solution is computed by solving a linear system. The two optimization sub-problems are alternately solved until the assignments do not change; typically, 20-30 iterations suffice for convergence.

FIG. 4C shows pseudocode Algorithm 2, which is the method for applying a mixture of GA-SDM regression experts, hereinafter "experts," according to preferred embodiments of the invention. The method comprises K iterations, which we call stages of a cascade.

FIG. 4A shows a flow diagram of one iteration, which we call stage k, of the method. Input to stage k is the image I and initial landmark locations $x_k$ 105. For each expert $E^l$, where $l=1, \ldots, L$, stage k of our GA-DSM 200 is applied 155 to yield each expert's updated landmark locations $x_{k+1}^l$ 156. The assignments $\alpha^l(x_k)$ 161 are determined according to equations (20-21), as described in detail below, and a weighted average 170 of the outputs of the L experts is determined as $$x_{k+1} = \sum_{l=1}^{L} \alpha^l(x_k) x_{k+1}^l,$$

which is explained below as equation (22). Then the updated landmark locations $X_{k+1}$ are output 171.

Each expert $E^l$ corresponds to one of the L prototype shapes: $l \in \{1, \ldots, L\}$. At each stage of the regression cascade, there is a separate regression for each expert $E^l$. Hence, in addition to the prototype shape locations $\{\bar{x}l\}$, each expert $E^l$ has a regression function $\{W_k^l, b_k^l\}$ for each of the K stages of the cascade:

$$E^l = \{\bar{x}^l, \{W_k^l, b_k^l\}_{k=1,\ldots,K}\}. \quad (18)$$

At each stage k of the cascade, each expert $E^l$ performs Algorithm 1 (FIG. 2B), i.e., stage k of GA-SDM, using as input that expert's prototype shape locations $\bar{x}^l$ and regression function $\{W_k^l, b_k^l\}$:

$$x_{k+1}^l = \text{Algorithm } 1(\bar{x}^l, \{W_k^l, b_k^l\}, I, x_k). \quad (19)$$

The notation in equation (19) indicates that $(\bar{x}^l, \{W_k^l, b_k^l\}I, x_k)$ are provided as inputs to Algorithm 1 (which is Stage k of GA-SDM, as detailed in FIG. 2B), and $x_{k+1}^l$ is the resulting output. The gating function for each expert $E^l$ is a soft assignment $\alpha^l(x_k)$ given by a softmax transformation of the global alignment error $\epsilon^l(x_k)$ between the landmark locations $x_k$ and each prototype shape's landmark locations $\bar{x}^l$. The soft assignments are computed using $$\alpha^l(x_k) = \frac{e^{-\epsilon^l(x_k)}}{\sum_{l=1}^{L} e^{-\epsilon^l(x_k)}}, \quad (20)$$

where $$\epsilon^l(x_k) = \min_{A \in \mathcal{A}} \|A(x_k) - \bar{x}^l\|^2, \text{ and} \quad (21)$$

the softmax function returns real values in the range (0, 1).

Here, as in equation (8), $\mathcal{A}$ denotes the set of all affine transformations. In some embodiments, $\mathcal{A}$ could represent a different class of global transformations. A high value of the score $\alpha^l(x_k)$ indicates that the current estimate of the location $x_k$ is close to the prototype shape of the lth expert, and hence the regression results obtained from $E^l$ are assigned a high weight. In FIG. 4B, we show the assignment weights of two faces to experts in the model.

At each stage k of the cascade, our mixture of experts alignment method applies every expert's regression function to the starting estimate of landmark locations $x_k$, then averages the outputs according to the gating function $\alpha^l(x_k)$ to obtain the updated estimate of landmark locations, $x_{k+1}$:

$$x_{k+1} = \sum_{l=1}^{L} \alpha^l(x_k) x_{k+1}^l. \quad (22)$$

Training the Experts

In the preferred embodiments, the regression functions of the experts are learned using training data that include a set of N face images and ground truth locations of facial landmarks in each of these N images. To learn the regression functions of the experts $E^l$, the N face images in the training data are augmented by repeating every training image M times, each time perturbing the ground truth landmark locations by a different random displacement. For each image $I_i$ in this augmented training set (i=1, ..., MN), with ground truth landmark locations $\hat{x}_i$, we displace the landmarks by a random offset $\Delta\hat{x}_i$. For every expert $E^l$, we use equations (20) and (21) to compute the soft assignment $\alpha_i^l$ of the ith sample's perturbed landmark locations to the prototype shape $\bar{x}^l$:

$$\alpha_i^l = \alpha^l(\hat{x}_i + \hat{x}_i). \quad (23)$$

While computing this soft assignment, we let $A_i^l$ denote the global (affine) transformation from equation (21) that best aligns the ith sample's perturbed landmark locations to the landmark locations of the prototype shape, $\bar{x}^l$. We use $A_i^l$ to transform the ground truth landmark locations and displacement vectors into the prototype coordinate frame of expert $E^l$:

$$\hat{x}_i^l = A_i^l(\hat{x}_i), \Delta\hat{x}_i^l = A_i^l(\Delta\hat{x}_i) \quad (24)$$

The first regression function (k=1) is then learned by minimizing a Tikhonov-regularized $L_2$-loss function:

$$\{W_k^l, b_k^l\} = \quad (25)$$

$$\arg\min_{W,b} \sum_{i=1}^{MN} \alpha_i^l \|\Delta\hat{x}_i^l - W\phi(I_i, \hat{x}_i^l - \Delta\hat{x}_i^l) - b\|^2 + \gamma[\|W\|_F^2 + \|b\|_F^2].$$

For each l and k, the regularizer weight $\gamma$ can be selected, e.g., via grid search in log space using 2-fold cross validation.

For training the later regressions $\{W_k, b_k\}_{k=2,\ldots,K}$, rather than using a random perturbation, the target $\Delta\hat{x}_i$ is the residual of the previous stages of the cascade.

In training, the regression function can diverge for a few samples producing large residuals. To avoid fitting these outliers, at each stage k, we remove 2% of the samples with the largest residuals from the training set. We sekect the number of regression stages K by training until the cross-validation error cannot be reduced further.

The training samples are generated by randomly perturbing the ground truth facial landmark locations along the major deformation directions of the training set, which are determined via principal component analysis. In addition, we apply random rotation, translation, and anisotropic scaling to the landmark locations, and add i.i.d. (independent and identically distributed) Gaussian noise. After learning the cascade model for this training set (usually K=3-4 stages), we learn a second cascade model using a training set consisting only of a small amount of i.i.d. Gaussian noise, and append this model to the original model. The second model has 1-2 stages and improves fine alignment.

Effect of the Invention

Described is an accurate face alignment method consisting of one or more (K≥1) steps, each of which includes a global alignment followed by a regression. In addition, we described a mixture of L GA-SDM regression experts. Each expert specializes in a different part of the joint space of pose and expressions by globally aligning the landmark locations to its prototype shape and learning a customized regression model. We also present a method to include deformation constraints within the discriminative alignment framework. Extensive evaluation shows that the proposed method significantly improves the state of the art.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for face alignment, comprising steps:
   acquiring an image of a face and a set of intitial landmark locations associated with the image;
   aligning globally the set of initial landmark locations to a set of landmark locations of a face with a prototype shape to obtain global alignment parameters;
   warping the set of initial landmark locations and the image from a coordinate frame of the image to a coordinate frame of the prototype shape according to the global alignment parameters, to obtain warped landmark locations and a warped face image;
   extracting features from the warped face image at the warped landmark locations;
   applying a regression function to the features to obtain updated landmark locations in the coordinate frame of the prototype shape; and
   warping the updated landmark locations in the coordinate frame of the prototype shape to the coordinate frame of the image, to obtain updated landmark locations in the image, wherein the steps are performed in a processor.

2. The method of claim 1, further comprising:
   applying the steps of claim 1 for K iterations, where K≥1, wherein the image is used for all iterations, and wherein at each iteration k>1, the set of initial landmark locations are the updated landmark locations in the image used during iteration k−1.

3. The method of claim 2, wherein the expert regression function is different at each iteration k.

4. The method of claim 3, wherein the regression function is learned using a set of training data that include a set of N images of faces and ground truth locations of the facial landmarks in each of these N images,
   wherein the training data are augmented by repeating every training image M times to produce a set of augmented training data,
   wherein for each image $I_i$ in the set of augmented training data, for i=1, ..., MN, image $I_i$ has ground truth landmark locations $\hat{x}_i$ that are displaced by offset $\Delta\hat{x}_i$, and wherein the regression function is learned by minimizing an $L_2$-loss function $$\{W_k, b_k\} = \underset{W,b}{\operatorname{argmin}} \sum_{i=1}^{MN} \|\Delta\hat{x}_i - W\phi(I_i, \hat{x}_i - \Delta\hat{x}_i) - b\|^2$$

to obtain linear regression function parameters $W_k$, $b_k$, wherein $W_k$ and $b_k$ respectively represent coefficients and a bias of the regression function, and $\phi$ represents the features.

5. The method of claim 4, wherein the offsets $\Delta\hat{x}_i$ are randomly determined.

6. The method of claim 4,
   wherein at iteration k=1 the offsets $\Delta\hat{x}_i$ are randomly determined, and
   wherein at each iteration k≥2, the offsets $\Delta\hat{x}_i$ are residuals after a previous iteration.

7. The method of claim 1, further comprising a set of L Globally Aligned Supervised Descent Method regression experts (experts),
   wherein the image is used by all experts,
   wherein each expert is associated with a different prototype shape and a different regression function,
   wherein a gating function produces an assignment weight for each of the L experts,
   wherein, for each of the L experts, the steps of claim 1 are performed, yielding L sets of updated facial landmark locations,
   and wherein the L sets of updated facial landmark locations are combined as a weighted average, using the assignment weights, to obtain the updated facial landmark locations.

8. The method of claim 7, further comprising:
   applying the method of claim 4 for K iterations, where K≥1, wherein the image is used for all iterations, and wherein at each iteration k>1, the initial landmark locations are the updated landmark locations obtained at iteration k−1.

9. The method of claim 8, wherein for each expert the regression function is different at each iteration.

10. The method of claim 7, wherein the prototype shapes of the L experts are determined by solving an optimization problem to obtain an affine-invariant clustering of the locations of the landmark in a set of training data.

11. The method of claim 7, wherein the gating function $\alpha^l$ of each expert $E^l$, where $l \in \{1, \ldots, L\}$, is a softmax transformation of a global alignment error $\epsilon^l(x_k)$ between landmark locations $x_k$ and the landmark locations of the prototype shape $\bar{x}^l$ of expert $E^l$:

$$\alpha^l(x_k) = \frac{e^{-\epsilon^l(x_k)}}{\sum_{l=1}^{L} e^{-\epsilon^l(x_k)}},$$

where the global alignment error for expert $E^l$ is $$\epsilon^l(x_k) = \min_{A \in {}_r\mathcal{A}} \|A(x_k) - \bar{x}^l\|^2,$$

where $\mathcal{A}$ represents a class of global transformations, A represents a particular transformation, and k indexes iteration of the method.

12. The method of claim 11, wherein the class of global transformations is a class of all possible 2D affine transformations.

13. The method of claim 7,
   wherein the regression function of each expert is learned using a set of training data that includes a set of N training face images and ground truth locations of facial landmarks in each of the N training face images,
   wherein the training data are augmented by repeating every training face image M times to produce a set of augmented training data,
   wherein for each image $I_i$ in the set of augmented training data, for i=1, ..., MN, image $I_i$ has ground truth landmark locations $\hat{x}_i$ that are displaced by offset $\Delta\hat{x}_i$
   wherein for each expert the regression function is learned by minimizing an $L_2$-loss function:

$$\{W_k^l, b_k^l\} = \underset{W,b}{\operatorname{argmin}} \sum_{i=1}^{MN} \alpha_i^l \|\Delta\hat{x}_i^l - W\phi(I_i, \hat{x}_i^l - \Delta\hat{x}_i^l) - b\|^2 + \gamma[\|W\|_F^2 + \|b\|_F^2],$$

wherein $\{W_k^l, b_k^l\}$ are parameters of the regression function of expert l,
wherein $\hat{x}_i^l = A_i^l(\hat{x}i)$ and $\Delta\hat{x}_i^l = A_i^l(\Delta\hat{x}_i)$, wherein $A_i^l$ is a transformation that transforms the ground truth landmark locations $\hat{x}_i$ and displacement vectors $\Delta\hat{x}_i$ from the coordinate frame of the image into the coordinate frame of the prototype for expert l,
wherein $\alpha_i^l$ is an assignment weight for expert l computed from the displaced landmark locations $\hat{x}_i^l + \Delta\hat{x}_i^l$ in the coordinate frame of the prototype for expert l, and $\gamma$ is a regularizer weight.

14. The method of claim 13, wherein at iteration k=1 the offsets $\Delta \hat{x}_i$ are randomly determined, and wherein at each iteration k≥2, the offsets $\Delta \hat{x}_i$ are residuals after a previous iteration.

15. The method of claim 1, wherein the method is used for emotion analysis.

16. The method of claim 1, wherein the method is used for super-resolution imaging.

17. The method of claim 1, wherein the method is used by advanced driver assistance systems.

18. The method of claim 1, wherein the method is for video conferencing.

19. The method of claim 1, wherein the image is acquired by a camera.

20. The method of claim 1, wherein the initial landmark locations are determined using a face detection algorithm.

21. The method of claim 1, wherein the initial landmark locations are determined using a facial part detection algorithm.

22. The method of claim 1, wherein the global alignment parameters represent a 2D affine transformation.

23. The method of claim 1, wherein the prototype shape comprises a mean location of each landmark over a set of training data.

24. The method of claim 1, wherein the extracting uses scale invariant feature transform (SIFT) features.

25. The method of claim 1, wherein the extracting uses Histogram of Oriented Gradients (HOG) features.

26. The method of claim 1, wherein the features include additional features encoding deviations of the warped landmark locations from landmark locations of the prototype shape $\lambda(x'_k - \bar{x})$, wherein $\lambda$ is a weight that controls a strictness of the constraint on deviations of the locations from the prototype shape, $x'_k$ is a vector of the warped landmark locations, and $\bar{x}$ is a vector of the landmark locations of the prototype shape, and k indexes iteration of the method.

27. The method of claim 1, wherein the regression function is a linear function.

28. The method of claim 1, wherein the regression function is a regression forest.

29. The method of claim 1, wherein the regression function is learned using a set of training data, which includes a set of N images of faces and ground truth locations of the facial landmarks in each of the N images.

* * * * *